United States Patent
Geroulo (10) Patent No.: US 7,493,184 B2
(45) Date of Patent: *Feb. 17, 2009

(54) AVAILABLE TO PROMISE ALLOCATION OPTIMIZATION TOOL

(75) Inventor: Michael T. Geroulo, Plattsburgh, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/031,767

(22) Filed: Feb. 15, 2008

(65) Prior Publication Data

US 2008/0215175 A1    Sep. 4, 2008

Related U.S. Application Data

(63) Continuation of application No. 11/427,900, filed on Jun. 30, 2006, now Pat. No. 7,386,358.

(51) Int. Cl.
*G06F 19/00* (2006.01)

(52) U.S. Cl. .................................................. 700/99

(58) Field of Classification Search ................ 700/99, 700/101, 103, 106, 108, 242

See application file for complete search history.

(56) References Cited

U.S. PATENT DOCUMENTS 6,895,384 B1 * 5/2005 Dalal ............................ 705/8

OTHER PUBLICATIONS

Jiao et al.; "An agent-based framework for collaborative negotiation in the global manufactruing supply chain network"; Apr. 2005; Science Direct; pp. 239-255.*

* cited by examiner

Primary Examiner—Albert DeCady
Assistant Examiner—Chad Rapp
(74) Attorney, Agent, or Firm—Kerry Goodwin (57) ABSTRACT

A distributed, network-based system and computer program product determines an optimal allocation of available to promise components in a supply chain. An aggregate demand request is generated by a demand entity intelligent agent. The aggregate demand request is propagated via a network throughout the supply chain to a plurality of supply entity intelligent agents. The supply entity intelligent agents respond with an evaluation of available to promise supply capability. Optimal allocation of the available to promise supply is made by calculating a sequence of squared set solutions of unit demand problems using a message-based communications protocol between the demand entity and supply entity intelligent agents.

11 Claims, 7 Drawing Sheets

AVAILABLE TO PROMISE ALLOCATION OPTIMIZATION TOOL

CROSS-REFERENCE TO RELATED APPLICATIONS

This application is a continuation of currently co-pending U.S. patent application Ser. No. 11/427,900, filed on Jun. 30, 2006.

BACKGROUND OF THE INVENTION

The invention relates generally to computer implemented supply chain planning and decision support tools, and more particularly to a tool used to manage available to promise resources in a supply chain.

Figure 1:
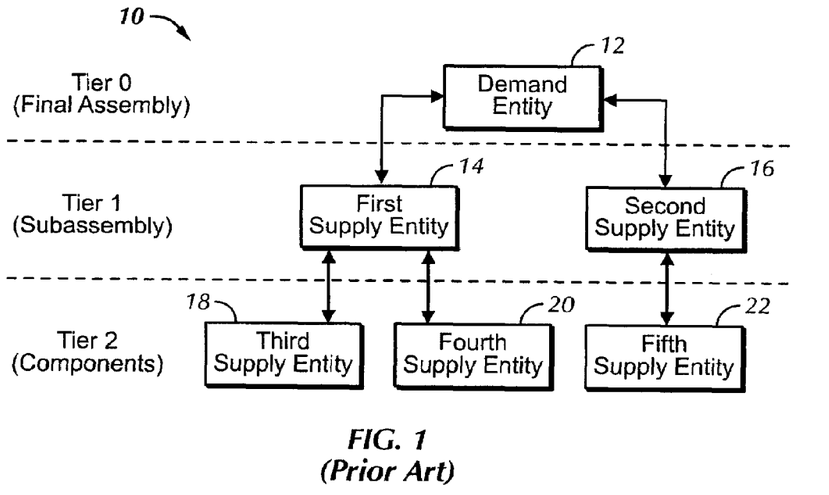
FIG. 1 is a block diagram schematic representation of a supply chain known in the prior art.

Demand-Supply Rationalization (DSR) software packages are used in manufacturing to ensure that supply is in some sense optimally allocated to prioritized demand. With reference to FIG. 1, these packages can be applied to a supply chain 10, illustrated to comprise three levels or tiers: a Tier 0 or final assembly level, a Tier 1 or subassembly level, and a Tier 2 or component level. It will be understood that the supply chain 10 could have as few as two levels, up to an arbitrarily large number N of levels. Tier 1 includes a demand entity 12, while Tier 1 is illustrated to include first and second supply entities 14 and 16, respectively. The number of Tier 1 supply entities can range from one to an arbitrarily large number M. Demand entity 12 is illustrated to require subassemblies from both the first and second supply entities 14 and 16 to produce a final assembly. Tier 2 is illustrated to include third, fourth, and fifth supply entities 18, 20, and 22, respectively. As with Tier 1, the number of Tier 2 supply entities is arbitrary. First supply entity 14 is illustrated to require components from both the third and fourth supply entities 18 and 20 to produce a first supply entity subassembly. Second supply entity 16 is illustrated to require components from only the fifth supply entity 22 to produce a second supply entity 16 subassembly.

It is known to mathematically or heuristically model a given multi-level and/or multi-supplier per level supply chain 10 using various techniques. For example, with reference to FIG. 2, a centralized supply chain model 30 considers the entire supply chain 10 as a single logical entity, functioning as a vertically integrated supply chain. The centralized supply chain model 30 includes a demand entity database 32 operably coupled to a central model 48. The centralized supply chain model 30 further includes Tier 1 and Tier 2 supply entity databases 36 and 38, respectively, which are operatively coupled to a central database 34 via Tier 1 and Tier 2 supply entity input bridges 40 and 42, respectively. Information contained in the Tier 1 and Tier 2 databases 36, 38 is operated on by Tier 1 and Tier 2 processes 44 and 46, respectively. Communication of information from the supply entity databases 36, 38 to the central database is characterized by a time lag. There are at least three components of the time lag: 1) job scheduling, that is, jobs are setup to run at fixed points in time which vary from enterprise to enterprise thereby creating a gap from the start of the first transmission job at the first enterprise to the start of the last transmission job at the last enterprise; 2) per job transmission time, that is, bulk transfer of large data sets can take minutes to hours to complete; and 3) process evaluation time, that is, a business review process 50 requires time to evaluate step specific results before proceeding to the next step in the end to end process. The central model 48 receives data from the central database 34. Output of the central model 48 is reviewed in the business review process 50 (typically performed by a human user). After a time lag, results of the analysis of the centralized supply chain model 30 (for example, firm orders for available to promise inventory) is communicated to the Tier 1 and Tier 2 supply entities via Tier 1 and Tier 2 supply entity results bridges 52 and 54, respectively.

Figure 2:
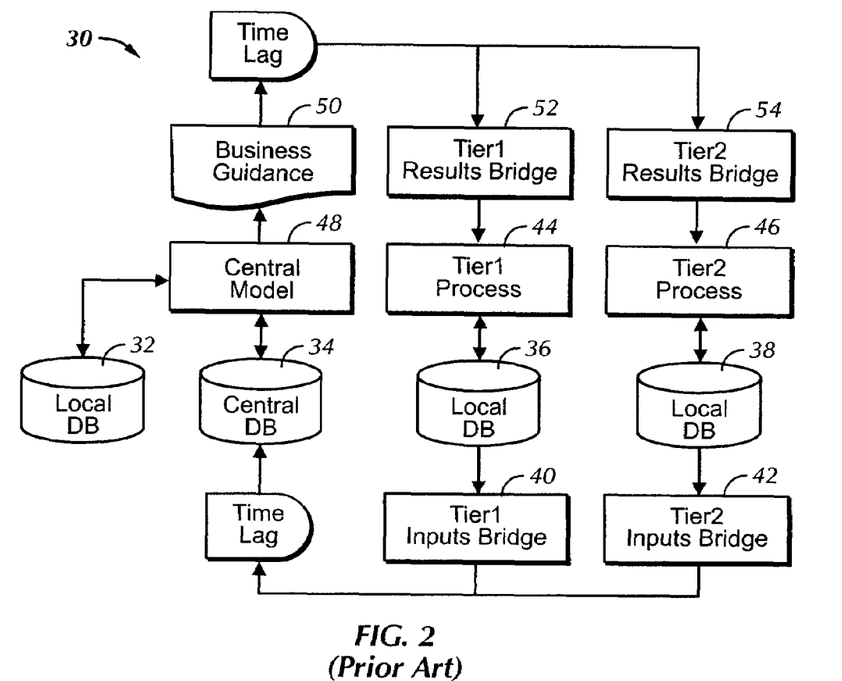
FIG. 2 is a block diagram schematic representation of elements of a centralized supply chain model known in the prior art.

The central model 48 thus receives all relevant data, from all levels, including all supply entities and the demand entity. With complete information regarding demand needs and supply capability, the central model 48 is capable of performing an end to end analysis over all levels and suppliers, and to develop an optimal allocation of supply to demand using either conventional heuristic or mathematical techniques, such as linear programming, to determine the allocation of components to maximize (that is, optimize) the number of end products ultimately produced by the demand entity 12 based on the components supplied in the demand request.

Figure 3:
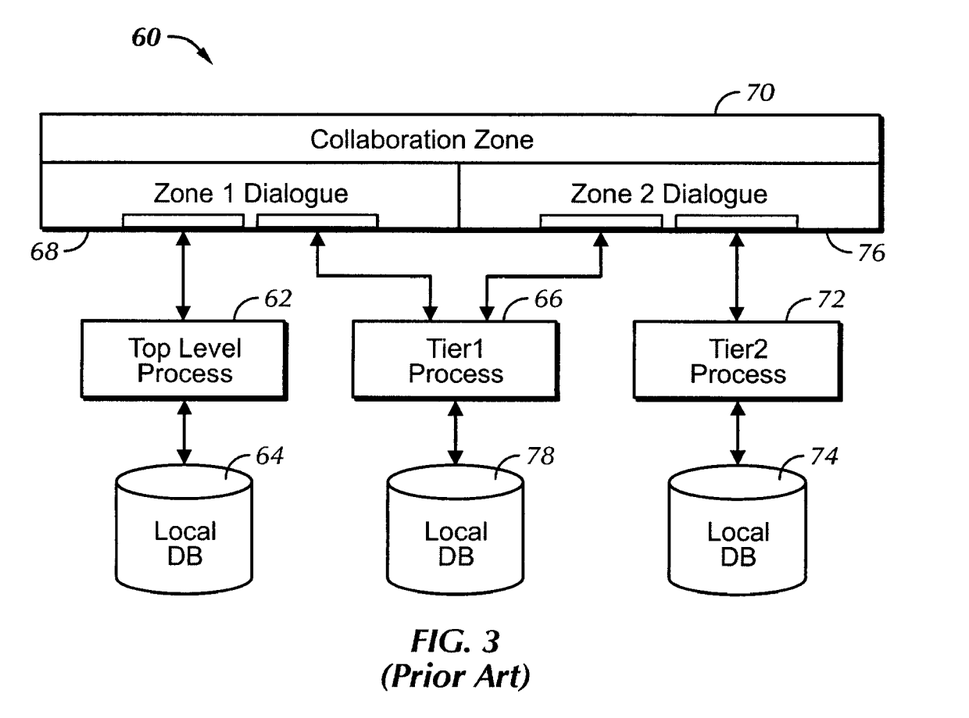
FIG. 3 is a block diagram schematic representation of elements of a loosely coupled supply chain model known in the prior art.

As a second example of known methods for modeling a supply chain 10, with reference to FIG. 3, it is known to use a so-called "loosely coupled" (or "disconnected") supply chain model 60. Unlike the centralized supply chain model 30, the loosely coupled supply chain model 60 does not require a central database or supply entity input or results bridges. In the loosely coupled model 60, allocation of supply proceeds from one tier to the next, working from the lowest tier to the top tier. Generally speaking, given a $level_{i+1}$ supply support position, and a $level_{i-1}$ demand, each $level_i$ entity runs a local allocation of supply to demand. The resultant $level_i$ support position relative to $level_{i-1}$ customer demand is then passed back to $level_{i-1}$ customers. For example, in the context of the loosely coupled model 60 illustrated in FIG. 3, a demand request is generated by a Tier 0 demand entity process 62. The demand entity process 62 is operatively coupled to a demand entity database 64. The demand request is communicated to Tier 1 supply entity process 66 via a zone 1 dialogue 68 within a collaboration zone 70. That level 0 customer demand is compared to a level 2 (Tier 2) supply support position. That is, a Tier 2 process 72 queries Tier 2 database 74, determines the supply support position, and communicates the supply support position to the Tier 1 process 66 via a zone 2 dialogue 76 within the collaboration zone 70. The supply support position information, combined with information stored in a Tier 1 database 78, allows the Tier 1 process 66 to provide a response to the demand request.

An advantage of the centralized supply chain model 30 is its ability to provide an optimal solution for allocation of available to promise inventory. A central disadvantage of the centralized supply chain model 30 is the relatively high expense (compared to the loosely coupled supply chain model) of providing, maintaining, and using the input and result bridges 40, 42, 52, and 54, and central database 34.

While there are development and operations savings as well as flexibility gains to be realized in use of a loosely coupled model 60, a significant disadvantage with use of the loosely coupled model 60 is that such models are unable to provide a closed, end to end optimal allocation of available to promise inventory. Given current solver techniques, end to end optimum allocation of supply to demand requires inter-level and intra-tier visibility to materials and/or capacity constraints. While this visibility is necessary, it is not sufficient to permit calculation of an optimal allocation of available to promise inventory. Coordinated inter-level and intra-tier allocations are required if the allocation result is to be optimum in terms of the top level demands and business rules. The centralized supply chain model 30 has the necessary visibility and sufficient control to effect end to end optimum allocation of supply to top level demand. The loosely coupled supply chain model 60 does not. Known loosely coupled supply chain models 60 provide suboptimal end to end allocations.

Given a trend away from physical or logical vertically integrated supply chains and single entity models toward dynamic multi-player loosely coupled supply chains, the inability of a loosely coupled model to develop a global optimum allocation of supply to demand is a significant and challenging problem.

Furthermore, there is a second disadvantage to the loosely coupled models 60. Disconnected models 60 typically require days to iteratively develop the equivalent of a closed-form, optimal response to a new top level demand statement. Many, if not most, businesses can ill afford to wait days or perhaps even weeks to respond to a demand change. Hence the time lags inherent in loosely coupled models 60 pose a significant business problem.

A need exists, therefore, for an available to promise inventory allocation tool providing both the time-efficient closed-form optimal allocation solutions characteristic of centralized supply chain models as well as the cost and flexibility benefits of the loosely coupled supply chain models.

BRIEF SUMMARY OF THE INVENTION

Briefly stated, in a first aspect the invention is a computing system for providing an optimal allocation of available to promise components in a supply chain having a demand entity and a plurality of supply entities. The computing system comprises a process controller operably coupled to a demand entity data base and a message server. The process controller is also operably coupled via a network to a plurality of supply entity process servers, supply entity databases, and supply entity message clients. A solver product is provided, responsive to material supply information, product supply rules, and supply priorities. The solver product includes a demand entity intelligent agent and a plurality of supply entity intelligent agents. The solver product also includes means for generating an aggregate demand request including priority information and requested delivery date information for components to be supplied to the demand entity by one or more of the plurality of supply entities. The solver product further includes means for propagating the demand request throughout the supply chain, so that the plurality of supply entity intelligent agents each associated with one of the plurality of supply entities is informed of the demand request for components supplied by that supply chain entity. Means are further provided for generating and communicating to the process controller an evaluation of available to promise supply capability from the plurality of supply entity intelligent agents. Also, means for generating an optimal allocation of available to promise components are provided.

Preferably, the means for generating an optimal allocation of available to promise components includes means for generating a sequence of demand problems, each demand problem being evaluated end to end through the supply chain, resulting in a series of squared set solutions. Preferably, the demand problems are unit demand problems.

The means for generating the sequence of demand problems preferably includes means for generating a message regarding a single demand item over the network to each of the plurality of supply entity agents, the message providing an inquiry of whether the supply entity can supply a quantity of the single demand item.

Further preferably, the intelligent agent of each of the plurality of suppliers generates a response to the message providing information regarding whether the supplier can supply the quantity of the single demand item. The network is preferably one of the Internet, an intranet, or a wide area network. The demand entity intelligent agent preferably further includes means for communicating acceptance of available to promise components based upon the optimal allocation.

BRIEF DESCRIPTION OF THE SEVERAL VIEWS OF THE DRAWINGS

The following detailed description of a preferred embodiment of the invention will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings.

DETAILED DESCRIPTION OF THE INVENTION

As used herein, when introducing elements of the present invention or the preferred embodiment(s) thereof, the articles "a", "an", "the" and "said" are intended to mean that there are one or more of the elements. An "intelligent agent" is a specialized software entity which autonomously performs tasks on behalf of users based on instructions given to it by the users, including communicating and exchanging data with other intelligent agents. "Available to Promise" (or ATP) is uncommitted existing inventory (or uncommitted planned inventory expected to be available by a desired delivery date). A "squared set" solution to a demand request means that sufficient Available to Promise inventory has been identified to satisfy the total demand.

Figure 4:
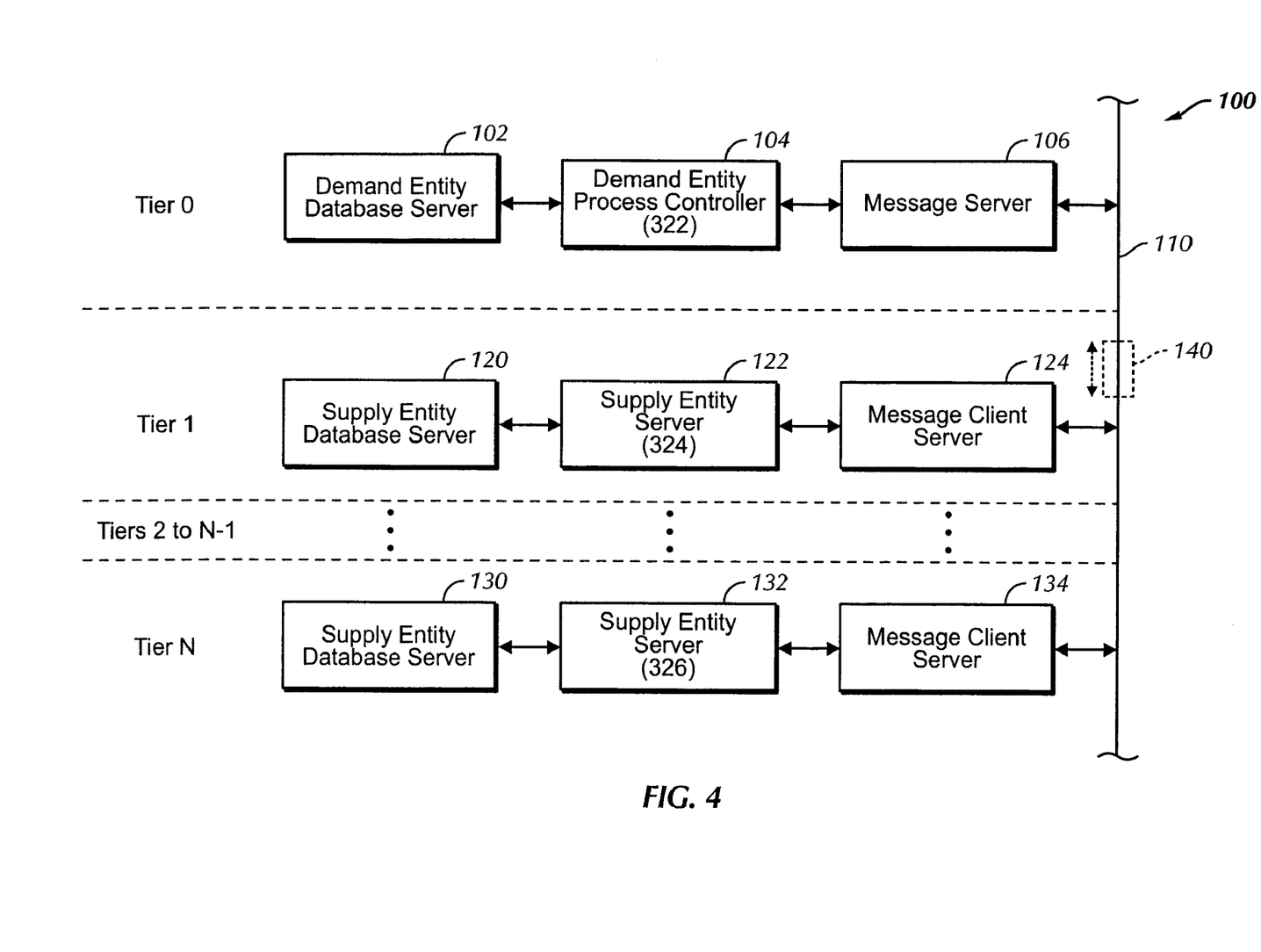
FIG. 4 is a schematic representation of hardware elements of an available to promise allocation system in accordance with a preferred embodiment of the present invention.
Figure 5:
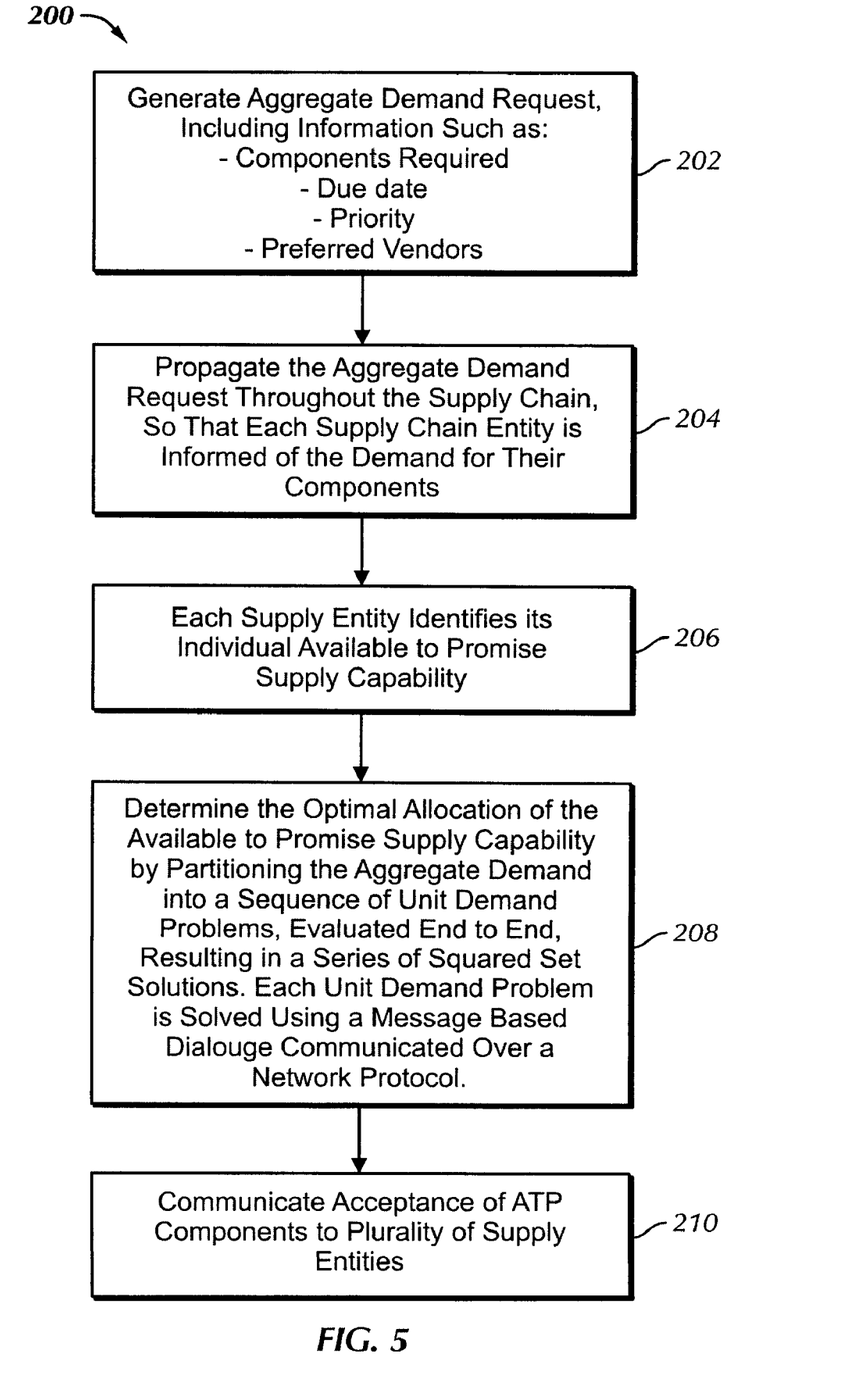
FIG. 5 is a block diagram of steps of a method of implementing the available to promise allocation system of FIG. 4.
Figure 6A:
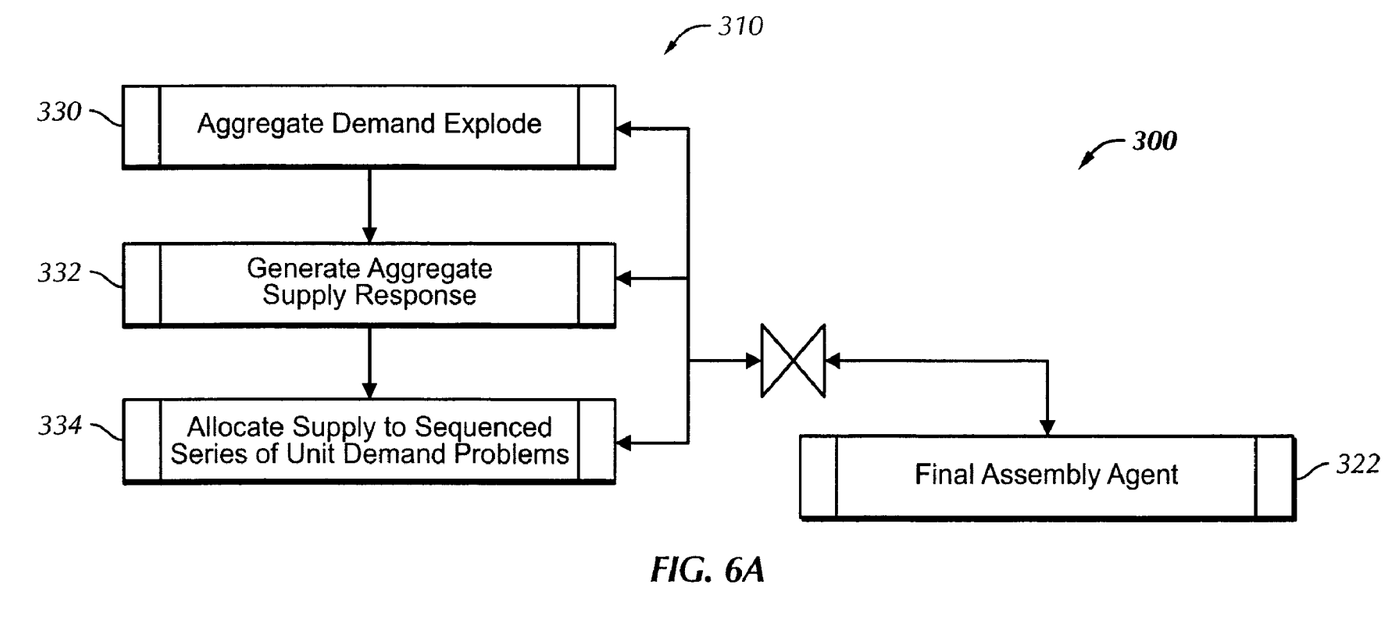
FIGS. 6A-6C are a series of flow charts of a computer program product implementing the available to promise allocation system of FIG. 4.
Figure 6B:
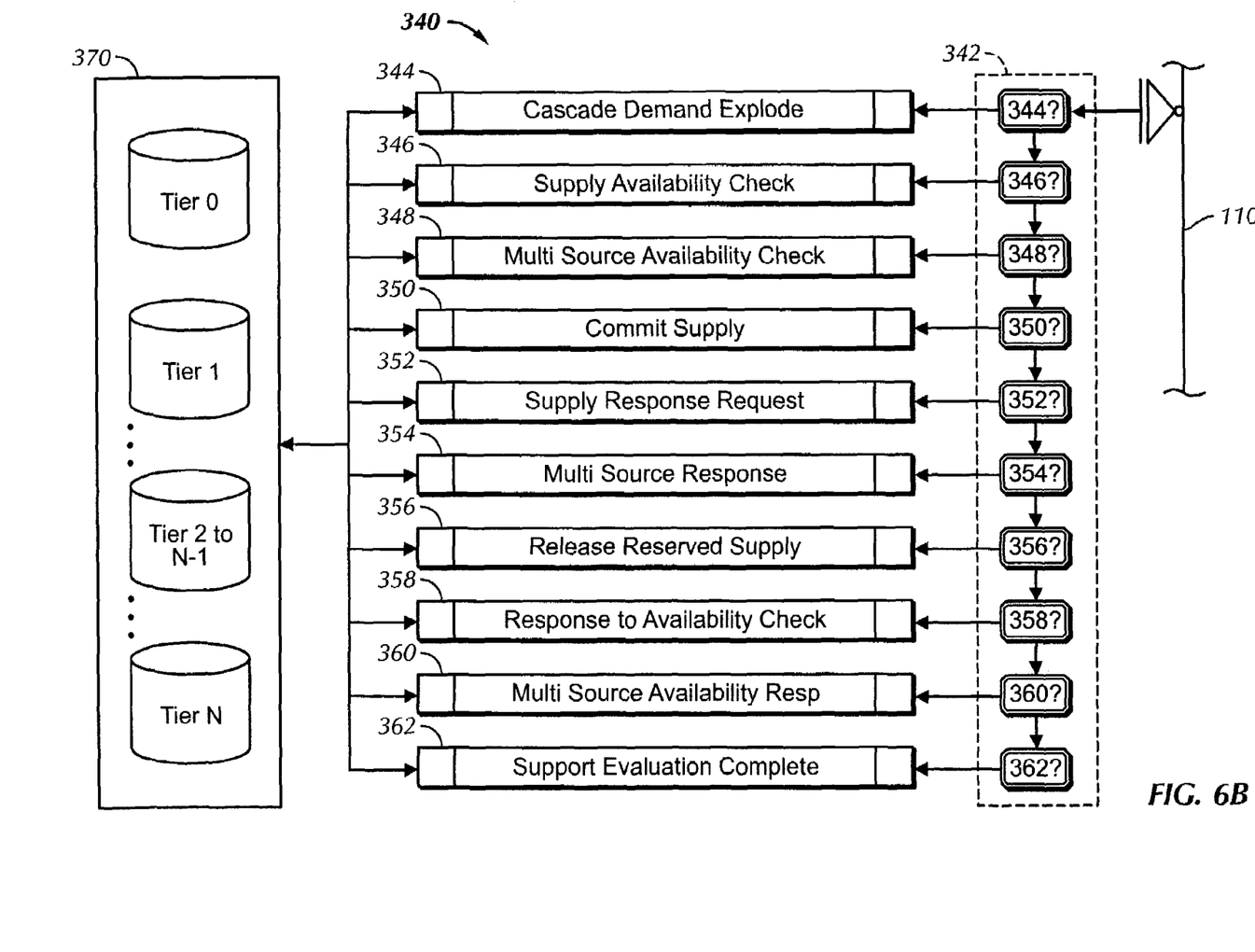
Figure 6C:
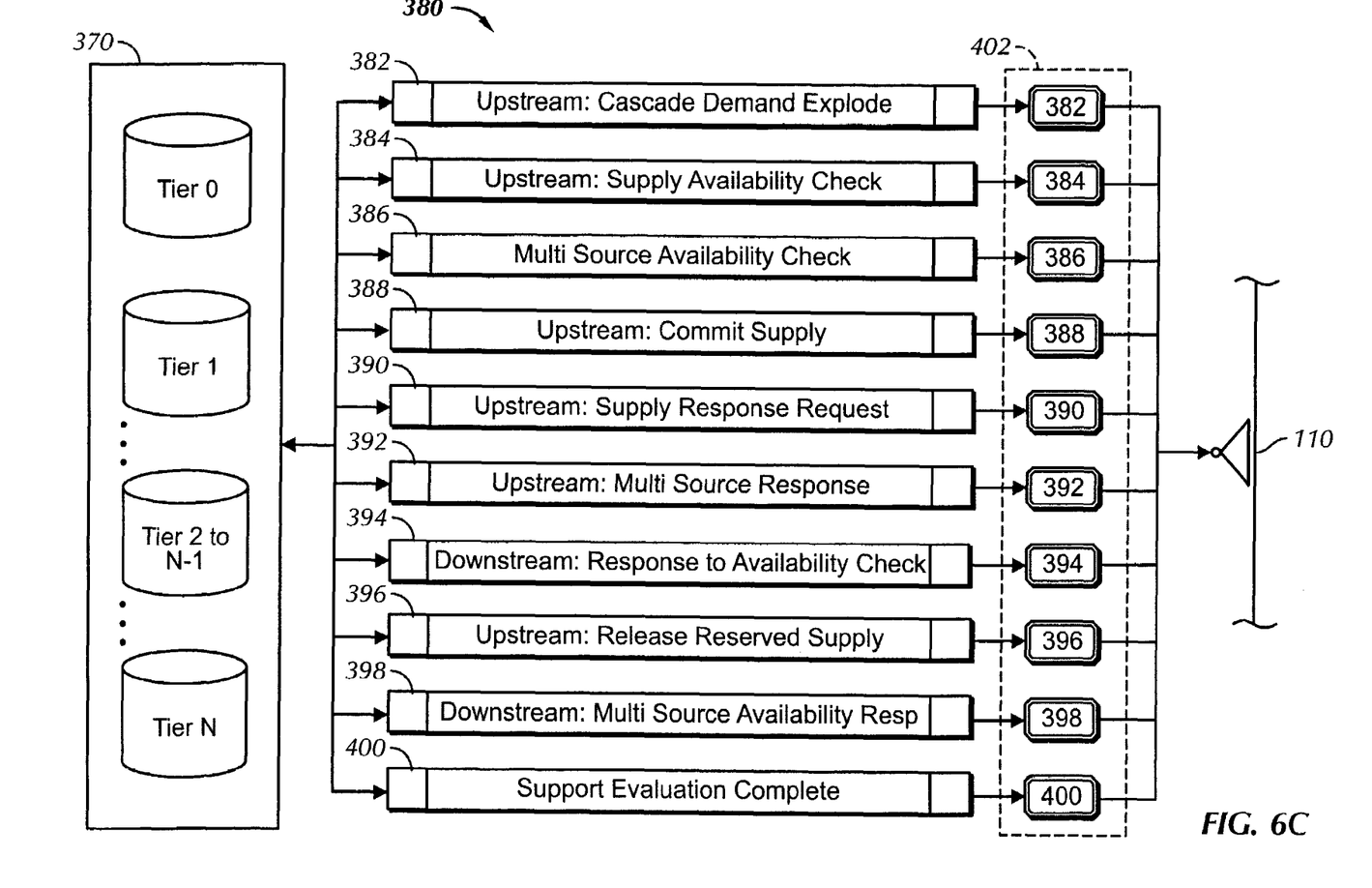

Referring to the drawings, shown in FIGS. 4-6 is a first presently preferred embodiment of an Available to Promise allocation optimization tool. With particular reference to FIG. 4, an ATP allocation optimization system 100 models a supply chain 10 having an arbitrary number of Tiers 0 through N. The supply chain 10 includes demand entity in Tier 0, a first supply entity in Tier 1 (although the number of Tier 1 supply entities is arbitrary), an arbitrary number of supply entities (not illustrated) in Tiers 2 through N-1 (not illustrated) and an Mth supply entity in Tier N (an arbitrary number M of supply entities can exist in Tier N). In one preferred embodiment, hardware elements of the system 100 comprise a demand entity database server 102, a demand entity process controller 104, and a demand entity message server 106. A demand entity intelligent agent 322 runs on the demand entity process controller 104. The demand entity database server 102, demand entity process controller 104, and message server 106 are operatively coupled to one another and to a message bus or network 110. The network 110 may be any conventional electronic communications network such as the Internet, an intranet, or a wide area network.

The system 100 further comprises a Tier 1 supply entity database server 120, a Tier 1 supply entity process server 122, and a Tier 1 supply entity message client 124, all associated with the Tier 1 supply entity, and all operatively coupled to one another and to the network 110. A Tier 1 supply entity intelligent agent 324 runs on the Tier 1 supply entity process server 122.

Though not illustrated, each additional supply entity in each additional Tier 1 through N similarly has associated with it a supply entity database server, a supply entity process server, and a supply entity message client. For example, as illustrated, in Tier N, the Mth supply entity has a database server 130, a process server 132 running a supply entity intelligent agent 326, and a message client server 134, all operatively couple to one another and to the network 110.

With reference to FIG. 4 as well as to FIGS. 5 and 6. the system 100 further comprises a solver product 300, including the software associated with the demand entity and supply entity intelligent agents 322, 324, and 326. The solver product 300 is responsive to material supply information, product supply rules, and supply priorities to determine an optimal allocation of ATP inventory (that is, an allocation of ATP inventory which maximizes total production of end products by the demand entity). The solver product 300 executes an ATP allocation optimization method 200. The solver product 300 includes means (first computer program code) for executing a step 202 of the method 200 of generating an aggregate demand request including priority information and requested delivery date information for components to be supplied to the demand entity by one or more of the plurality of supply entities. The solver product 300 further includes means (second computer program code) for executing a step 204 of the method 200 of propagating the demand request throughout the supply chain via the network 110 so that each of the plurality of supply chain entities is informed of the demand request for components supplied by that supply chain entity.

Still further, the solver product 300 includes means (third computer program code) for executing a step 206 of the method 200 of generating and communicating an evaluation of available to promise supply capability for each of the supply entities. The evaluation is made by each supply entity intelligent agent reviewing information resident in the associated supply entity database.

The solver product 300 further includes means (fourth computer program code) for executing a step 208 of method 200 of generating an optimal allocation of the ATP inventory based on the ATP supply capability. Preferably, the means for generating the optimal allocation of ATP inventory includes means for generating and communicating a sequence of demand problems. Preferably, the demand problems are sequentially incremented by a predefined amount. Each demand problem is evaluated end to end though the supply chain 10, resulting in a series of squared set solutions. Preferably, system 100 further includes means (fifth computer program code) for executing a step 210 of method 200 of communicating acceptance of ATP components to the plurality of supply entities.

With reference now to FIG. 6A, the solver product 300 may be represented by a top level flowchart 310 illustrating three fundamental processes: an aggregate demand explode process 330; an aggregate supply response process 332; and an allocation of supply process 334. These three processes 330, 332, and 334 are accomplished by the exchange of a plurality of messages 140 which are transferred between the message server 106 and message clients 124, 134. Each message 140 corresponds to a vector of information which preferably specifies:

a. customer supplier relationships or, from a network point of view, the sender and receiver of the message;
   b. a sequence ID to uniquely identify the message and enable a response to trace back to a request;
   c. message directive which identifies the process behavior that's driven by the message;
   d. demand ID, that is a specific final assembly, sub assembly, or component;
   e. demand priority or relative business value of the demand;
   f. customer demand quantity; and
   g. supplier commit quantity, that is level of demand supported.

The exchange of messages 140 is accomplished by a network incoming message evaluation process 340 and a network outgoing message generation process 380. With reference to FIG. 6B, relative to the network incoming evaluation process 340, the message directive of item c. of the message 140 information described above is one of a number of sub-processes:

a. a cascade demand explode evaluation sub-process 344;
   b. an evaluation of available supply sub-process 346;
   c an evaluation of multiple sources for available supply sub-process 348;
   d a commitment of a reserved supply sub-process 350;
   e. a supply response request sub-process 352;
   f. a request of multiple sources for a supply response sub-process 354;
   g. a release of a reserved supply sub-process 356;
   h. a response to a single source availability check sub-process 358;
   i. a response to a multi-source availability check sub-process 360; and
   j. a support evaluation completion message evaluation sub-process 362.

Incoming messages 140 are identified and routed to the appropriate tier and sub-process using an identification and routing sub-process 342.

With reference now to FIG. 6C, the outgoing message generation process 380 comprises one of a plurality of sub-processes:

a. an upstream cascade demand explode response sub-process 382;
   b. an upstream supply availability check response sub-process 384;
   c. a multi-source supply availability check response sub-process 386;
   d. an upstream commitment of reserved supply response sub-process 388;
   e. an upstream supply response request sub-process 390;
   f. an upstream multi-source supply response sub-process 392;
   g. a downstream response to an availability check sub-process 394;
   h. an upstream release of reserved supply sub-process 396;
   i. a downstream multi-source response to an availability check sub-process 398; and
   j. a support evaluation complete message generation sub-process 400.

Outgoing messages 140 are identified and routed to the appropriate tier by an identification and routing sub-process 402.

The system 100 thus uses a star type architecture with any to any communication capability through a message exchange. Anywhere from 1 to M supply chain players in 1 to N supply chain tiers, each representing a role specific demand or supply business entity communicate with their suppliers and/or customers by posting messages to a message exchange, and periodically polling for and pulling from the message exchange any incoming mail from suppliers and/or customers. A specific supply chain player can only see messages addressed to their business entity.

It will be noted that while the message server 106 has a message que that contains snippets of demand and supply information, there is no queryable central data repository as is found in the centralized supply chain model 30. Messages 140 flow through the message que on their way from the sender to the receiver. Messages 140 stay in the message que only until a receiver picks them up.

The typical collaboration dialogue used by the centralized model 30 or the loosely coupled model 60 entail a multi-item request followed by a multi-item response. That is, prior art models might in a single request ask a supplier to evaluate its ability to support a demand statement consisting of multiple demand items. And the supplier in turn provides a single response which covers their ability to supply all demand items in the request. Unlike the typical solution dialogue, the message 140 employed by the network based demand supply rationalization method 200 equates to a request to evaluate a support position for a single demand item. It is the carefully sequenced end to end evaluation of a series of single item message objects that allows the network base demand supply optimization method 200 to effect a coordinated inter entity, inter level priority driven squared set allocation of supply to a multi item demand statement.

From the foregoing it can be seen that the present invention provides an available to promise inventory allocation tool providing both the time-efficient closed-form optimal allocation solutions characteristic of centralized supply chain models as well as the cost and flexibility benefits of the loosely coupled supply chain models.

It will be appreciated by those skilled in the art that changes could be made to the embodiments described above without departing from the broad inventive concept thereof. It is to be understood, therefore, that this invention is not limited to the particular embodiments disclosed, but it is intended to cover modifications within the spirit and scope of the present invention as defined by the appended claims.

That which is claimed is:

1. A computing system for providing an optimal allocation of available to promise components in a supply chain having a demand entity and a plurality of supply entities forming multiple supplier tiers, the computing system comprising:
    a process controller operably coupled to a demand entity data base and a message server;
    the process controller also being operably coupled via a network to a plurality of supply entity process servers, supply entity databases, and supply entity message clients; and
    a solver product responsive to material supply information, product supply rules, and supply priorities, including:
        a demand entity intelligent agent;
        a plurality of supply entity intelligent agents;
        means for generating an aggregate demand request including priority information and requested delivery date information for components to be supplied to the demand entity by one or more of the plurality of supply entities;
        means for propagating the demand request throughout the supply chain, so that the plurality of supply entity intelligent agents each associated with one of the plurality of supply entities is informed of the demand request for components supplied by that supply chain entity;
        means for generating and communicating to the process controller an evaluation of available to promise supply capability from the plurality of supply entity intelligent agents; and
        means for generating an allocation of available to promise components which is optimal from the perspective of the demand entity,
    wherein the means for generating an allocation of available to promise components includes means for generating a sequence of demand problems, each demand problem being evaluated end to end through the supply chain, resulting in a series of squared set solutions.

2. The computing system of claim 1, wherein the demand problems are unit demand problems.

3. The computing system of claim 1, wherein the means for generating the sequence of demand problems includes means for generating a message regarding a single demand item over the network to each of the plurality of supply entity agents, the message providing an inquiry of whether the supply entity can supply a quantity of the single demand item.

4. The computing system of claim 3, wherein the intelligent agent of each of the plurality of suppliers generates a response to the message providing information regarding whether the supplier can supply the quantity of the single demand item.

5. The computing system of claim 1, wherein the network is one of an Internet, an intranet, or a wide area network.

6. The computing system of claim 1, wherein the demand entity intelligent agent further includes means for communicating acceptance of available to promise components based upon the optimal allocation.

7. A computer program product comprising:
    a computer readable medium having computer readable program code for determining an optimal allocation of available to promise components in a supply chain having a demand entity and a plurality of supply entities forming multiple supplier tiers, the computer program product including:
        first computer program code for generating an aggregate demand request including priority information and requested delivery date information for components to be supplied to the demand entity by one or more of the plurality of supply entities;
        second computer program code for propagating the demand request throughout the supply chain via a network, so that a plurality of supply entity intelligent agents each associated with one of the plurality of supply entities is informed of the demand request for components supplied by that supply chain entity;
        third computer program code for receiving an evaluation of available to promise supply capability from each of the plurality of supply entity intelligent agents; and
        fourth computer program code for generating an allocation of available to promise components which is optimal from the perspective of the demand entity,
    wherein the fourth computer program code includes program code to generate a sequence of demand problems, each demand problem being evaluated end to end through the supply chain, resulting in a series of squared set solutions.

8. The computer program product of claim 7, wherein the demand problems are unit demand problems.

9. The computer program product of claim 7, wherein the fourth computer program code further includes program code to generate a message over the network to each of the plurality of supply entity intelligent agents, the message providing an inquiry of whether the supply entity can supply a quantity of components.

10. The computer program product of claim 7, wherein the fourth computer program code further includes program code to cause each of the plurality of supply entity intelligent agents generating a response to the message providing information regarding whether the supply entity can supply the quantity of components.

11. The computer program product of claim 7, further comprising fifth computer program code to cause the demand entity intelligent agent communicating acceptance of the available to promise components to the supply entity intelligent agents based upon the optimal allocation.

* * * * *